(12) United States Patent
Weber et al.

(10) Patent No.: US 12,091,485 B2
(45) Date of Patent: Sep. 17, 2024

(54) POLYARYLENE ETHER COPOLYMER

(71) Applicant: BASF SE, Ludwigshafen am Rhein (DE)

(72) Inventors: Martin Weber, Ludwigshafen am Rhein (DE); Christian Maletzko, Ludwigshafen am Rhein (DE); Rene Backes, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 632 days.

(21) Appl. No.: 17/275,558

(22) PCT Filed: Sep. 6, 2019

(86) PCT No.: PCT/EP2019/073784
§ 371 (c)(1),
(2) Date: Mar. 11, 2021

(87) PCT Pub. No.: WO2020/053078
PCT Pub. Date: Mar. 19, 2020

(65) Prior Publication Data
US 2022/0098352 A1    Mar. 31, 2022

(30) Foreign Application Priority Data

Sep. 11, 2018 (EP) ..................... 18193778

(51) Int. Cl.
| | | |
|---|---|---|
| *C08F 293/00* | (2006.01) | |
| *B01D 53/22* | (2006.01) | |
| *B01D 69/08* | (2006.01) | |
| *B01D 71/52* | (2006.01) | |
| *B01D 71/68* | (2006.01) | |
| *B01D 71/80* | (2006.01) | |
| *C09D 153/00* | (2006.01) | |
| *D01F 6/66* | (2006.01) | |
| *D01F 6/76* | (2006.01) | |

(52) U.S. Cl.
CPC .......... *C08F 293/00* (2013.01); *B01D 53/228* (2013.01); *B01D 69/08* (2013.01); *B01D 71/522* (2022.08); *B01D 71/68* (2013.01); *B01D 71/80* (2013.01); *C09D 153/00* (2013.01); *D01F 6/665* (2013.01); *D01F 6/765* (2013.01)

(58) Field of Classification Search
CPC ..... C08F 293/00; C09D 153/00; B01D 71/52; B01D 71/68; B01D 53/228; B01D 69/08; B01D 71/80; D01F 6/765; D01F 6/665
USPC ....................................... 524/611
See application file for complete search history.

(56) References Cited

U.S. PATENT DOCUMENTS

| | | | |
|---|---|---|---|
| 7,163,987 B2 | 1/2007 | Weber et al. | |
| 2016/0108178 A1* | 4/2016 | Weber ................... | B01D 71/80 210/500.33 |
| 2017/0240708 A1 | 8/2017 | Lim et al. | |

FOREIGN PATENT DOCUMENTS

| | | |
|---|---|---|
| EP | 2739668 A1 | 6/2014 |
| WO | 2013/020871 A1 | 2/2013 |
| WO | 2013/023997 A1 | 2/2013 |
| WO | 2014/072473 A2 | 5/2014 |
| WO | 2016/032179 A1 | 3/2016 |

OTHER PUBLICATIONS

International Preliminary Report on Patentability received for PCT Patent Application No. PCT/EP2019/073784, mailed on Oct. 26, 2020, 4 pages.
International Search Report and Written Opinion received for PCT Patent Application No. PCT/EP2019/073784, mailed on Sep. 26, 2019, 8 pages.
Abderrazak, et al., "Synthesis of New Poly(ether ketone)s Derived from Biobased Diols", Macromolecular Chemistry and Physics, vol. 214, Issue 13, Jun. 7, 2013, pp. 1423-1433.
Belgacem, et al., "Copolyethersulfones of 1,4:3,6-dianhydrohexitols and bisphenol A", Designed Monomers and Polymers, vol. 19, Issue 3, Jan. 29, 2016, pp. 248-255.
Chatti, et al., "Poly(ether sulfone) of Isosorbide, Isomannide and Isoidide", High Performance Polymers, vol. 21, Issue 1, Apr. 2, 2008, pp. 105-118.
El-Hibri, et al., "Polysulfones", Encyclopedia of Polymer Science and Technology, ed. Herman F. Mark, 3rd Edition, vol. 4, 2003, pp. 1-26.
European Search Report for EP Patent Application No. 18193778.0, Issued on Jan. 30, 2019, 3 pages.
Hans R. Kricheldorf, "Chapter 7: Aromatic polyethers", Handbook of Polymer Synthesis, ed. Kricheldorf, et al., 2nd Edition, 2005, pp. 427-501.
Hans-Georg Elias, "Chapter 4.1: Polycondensations and Polyadditions", An Introduction to Polymer Science, Ed. Barbara Bock, 1st Edition, Mar. 1997, pp. 124-127.
Kricheldorf et al., "New polymer syntheses. LXXXII. Syntheses of poly(ether-sulfone)s from silylated aliphatic diols including chiral monomers", Journal of Polymer Science Part A: Polymer Chemistry, vol. 33, Issue 15, Nov. 15, 1995, pp. 2667-2671.
Noshay et al., "Polysulfone-polydimethylsiloxane block copolymers", Journal of Polymer Science Part A-1: Polymer Chemistry, vol. 9, Issue 11, Nov. 1971, pp. 3147-4159.

(Continued)

*Primary Examiner* — Hui H Chin
(74) *Attorney, Agent, or Firm* — Faegre Drinker Biddle & Reath LLP

(57) ABSTRACT

A polyarylene ether copolymer comprising i) at least one block comprising in polymerized form A) isosorbide, isomannide, isoidide or a mixture thereof and B) at least one unit comprising at least one difunctional compound comprising at least one dichlorodiaryl sulfone, a dichlorodiaryl ketone or a mixture thereof and ii) at least one block comprising in polymerized form C) at least one polyalkylene oxide, a process for its preparation and its use in the preparation of coatings, films, fibers, foams, membranes or molded articles.

17 Claims, No Drawings

(56) References Cited

OTHER PUBLICATIONS

Ting et al., "Preparation of Polysulfone/Poly(ethylene oxide) Block Copolymers", Macromolecules, vol. 29, Issue 23, Nov. 4, 1996, pp. 7619-7621.
Viswanathan et al., "Synthesis, kinetic observations and characteristics of polyarylene ether sulphones prepared via a potassium carbonate DMAC process", Polymer, vol. 25, Issue 12, Dec. 1984, pp. 1827-1836.

* cited by examiner

POLYARYLENE ETHER COPOLYMER

CROSS-REFERENCE TO RELATED APPLICATIONS

This application is a national stage application (under 35 U.S.C. § 371) of PCT/EP2019/073784, filed Sep. 6, 2019, which claims benefit of European Application No. 18193778.0, filed Sep. 11, 2018, both of which are incorporated herein by reference in their entirety.

The present invention relates to polyarylene ether sulfone or ketone copolymers comprising one or more blocks based on diols which are derived from an anhydro sugar and one or more polyalkylene oxide blocks.

Polyarylene ether sulfones and polyarylene ether ketones are classified as high-performance thermoplastics. In several scientific publications the preparation and the properties of polyarylene ether sulfones and polyarylene ether ketones derived from biobased diols are disclosed (Kricheldorf et al. J Polm. Sci. Part A: Polymer Chemistry, Vol 33, 2667-2671 (1995); Chatti et al. High Performance Polymers, 21: 105-118, 2009; Abderrazak et al. Macromol. Chem. Phys. 2013, 214, 1423-1433; Belgacem et al. Designed Monomers and Polymers, 2016, Vol 19, No. 3, 248-255). Polyarylene ether sulfones derived from 1,4:3,6-dianhydrohexitols are also disclosed in WO 2014/072473 and US 2017/0240708 A1. Compositions having improved melt stability and comprising up to 20% by weight (wt %) of a polyarylene ether sulfone containing up to 10 wt % of units derived from 1,1,1-tris(4-hydroxyphenyl) ethane are known from U.S. Pat. No. 7,163,987 B2.

Polyarylene ether sulfones comprising polyalkyleneoxide units are for instance known from Hancock, Macromolecules 1996, 29, 7619 and EP 2739668.

The problem addressed by the present disclosure is to present a new polyarylene ether which comprises at least one —$SO_2$— or —CO— group and which is derived from isosorbide, isomannide, isoidide or a mixture thereof. Moreover, said polyarylene ether should have high molecular weight as well as high hydrophilicity. One motivation was to present a new polyarylene ether which is suitable for the manufacture of membranes. Membranes having good separation properties in combination with a high permeability were aimed at, in particular for the use in contact with water, a body fluid or a liquid in food production. Further, a process for the manufacture of said new polyarylene ether in good yield within an industrially acceptable reaction time should be provided.

Hereinunder a polyarylene ether copolymer is disclosed which comprises
i) at least one block comprising in polymerized form
    A) isosorbide, isomannide, isoidide or a mixture thereof, and
    B) least one difunctional compound comprising at least one dichlorodiaryl sulfone or dichlorodiaryl ketone or a mixture thereof, and
ii) at least one block comprising in polymerized form
    C) at least one polyalkylene oxide.

Further, a process is disclosed for the manufacture of a polyarylene ether copolymer which comprises reacting a) isosorbide, isomannide, isoidide or a mixture thereof and b) at least one difunctional compound comprising a dichlorodiaryl sulfone, a dichlorodiaryl ketone or a mixture thereof with c) at least one polyalkylene oxide. The use of at least one of said, respectively the so obtained, polyarylene ether copolymer in the manufacture or for the manufacture of a coating, fiber, film, foam, membrane or molded article as well as a fiber or membrane comprising at least one of said or the so obtained polyarylene ether copolymer is disclosed as well. In addition, a dope solution for the manufacture of membranes comprising the polyarylene ether copolymer is disclosed. Moreover, a fiber and a membrane comprising said polyarylene ether copolymer is disclosed. Further an article comprising at least one of said membrane is disclosed. In addition, the use of said membrane in contact with water, a body fluid or a liquid in food production is disclosed.

In the following "at least one" in general means one or two or more, such as three or four or five or more, wherein more may mean a plurality or an uncountable. For instance, "at least one" may mean one or a mixture of two or more. If used in connection with chemical compounds "at least one" is meant in the sense that one or two or more chemical compounds differing in their chemical constitution, that is chemical nature, are described.

The person skilled in the art appreciates that any polymer, may it be a homopolymer or a copolymer by nature typically is a mixture of polymeric individuals differing in their constitution such as chain length, degree of branching or nature of end groups. This fact is also often described as distribution. Thus, in the following "at least one" as prefix to a polymer means that different types of polymers may be encompassed whereby each type may have a certain distribution addressed above.

The person skilled in the art further appreciates that any polymer is derived from monomers or oligomers or mixtures thereof which the polymer then comprises in reacted, polymerized form.

When it is stated herein that a block or a polyalkylene oxide comprises an alkylene oxide or tetrahydrofurane, this is to be understood in the sense that said polyalkylene oxide comprises said alkylene oxide or tetrahydrofurane in polymerized form, that is to say in a ring-opened form.

In the following
compound A is isosorbide, isomannide, isoidide or a mixture thereof;
compound B is at least one difunctional compound comprising at least one dichlorodiaryl sulfone or dichlorodiaryl ketone or a mixture thereof;
compound C is at least one polyalkylene oxide
compound D is at least one compound having two hydroxy groups and which is not compound A and not compound C;
compound E is at least one tri- or higher functional compound;
compound F at least one compound with one functional group reactive towards reactive groups comprised in a polymeric chain
starting compounds are compounds A, B, C and if present compound D and/or compound E prior to being polymerized
solvent L is at least one solvent A suitable polyarylene ether copolymer useful according to this disclosure comprises at least one block i) comprising compound A and compound B.

Compound A

Compound A is isosorbide, isomannide, isoidide or a mixture thereof. Compound A is known to those skilled in the art. Isosorbide, isomannide and isoidide belong to the family of 1,4:3,6-dianhydrohexitols and are of formula I:

(Ia)

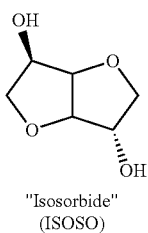

"Isosorbide"
(ISOSO)

(Ib)

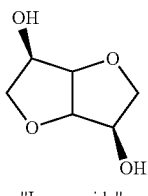

"Isomannide"
(ISOMA)

(Ic)

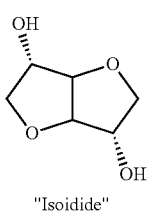

"Isoidide"
(ISOID)

Depending on the desired properties such as glass transition temperature and the modulation thereof the polyarylene ether copolymer may in the at least one block i) comprise as compound A one or a mixture of two or of all three of said dianhydrohexitols. Thus, for instance it may comprise isosorbide and isomannide, isosorbide and isoidide or isomannide and isoidide. It may be preferred that only isosorbide, isomannide or isoiodide is comprised. Isosorbide may be most preferred for instance for the fact that it is commercially available and the thermal stability which it may impart to the polyarylene ether copolymer. Isoidide may have advantages with respect to ease of reaction.

The polyarylene ether copolymer may comprise in the at least one block i) compound A as the sole diol. It is also possible that in addition the at least one block i) is derived from at least one further compound which is difunctional and has two hydroxy groups, that is a diol which is not compound A and not compound C (compound D) and which is comprised in the polyarylene ether in polymerized form. It may be possible that the at least one block i) is derived from 5 to 100 mol % of compound A, based on the total weight of starting material of compounds A, C, D and E. It may be more preferred that the at least one block i) is derived from 25 to 100 mol %, most preferably from 50 to 100 mol % of compound A, based on the total weight of starting material of compounds A, C, D and E. In particular, if a polyarylene ether copolymer is sought for the manufacture of products for contact with water, liquids in food production or the medicinal field, more specifically for the production of hollow fibers or membranes in said fields, it may be advantageous that it comprises compound A as the sole diol in the at least one block i).

The at least one block i) comprises in polymerized form at least one difunctional compound comprising a dichlorodiaryl sulfone, a dichlorodiaryl ketone or a mixture thereof (compound B).

Compound B

Compound B is known or if not known per se it may be prepared by methods known to those skilled in the art. Compound B is a difunctional compound. "Difunctional" means that it has two functional groups that are reactive towards compounds A, C and if present compounds D and/or E. Generally compound B is not subject to any fundamental restriction, provided that it is sufficiently reactive within a nucleophilic aromatic substitution.

Compound B comprises at least one dichlorodiaryl sulfone or dichlorodiarly ketone or a mixture thereof. In addition, compound B can for instance comprise at least one compound which is difunctional and allows the preparation of a polyarylene ether sulfone copolymer or a polyarylene ether ketone copolymer which comprises —S—, S=O, —N=N—, and/or —CR$^a$R$^b$— groups.

In case that the polyarylene ether copolymer is a polyarlyene ether ketone copolymer compound B can be at least one, for instance be one or more dichlorodiaryl ketones, such as 1 to 3 dichlorodiaryl ketones, whereby 1 or 2 dichlorodiaryl ketones, in particular one may be preferred. It is also possible that compound B is a mixture of at least 50 mol % of at least one dichlorodiaryl ketone and less than 50 mol % of at least one dichlorodiarylsulfone. For instance, compound B can be a mixture of from 50 mol-% such as 60 mol % to 80 mol-% or more, such as 90 mol % of at least one dichlorodiaryl ketone and the remainder being at least one dichlorodiaryl sulfone, such as 1 to 3, whereby 1 or 2, in particular one may be preferred dichlorodiaryl sulfone.

In case that the polyarylene ether copolymer is a polyarylene ether sulfone copolymer compound B can be at least one, for instance be one or more dichlorodiaryl sulfones, such as 1 to 3 dichlorodiaryl sulfones, whereby 1 or 2 dichlorodiaryl sulfones, in particular one may be preferred. It is also possible that compound B is a mixture of at least 50 mol % of at least one dichlorodiaryl sulfone and less than 50 mol % of at least one dichlorodiaryl ketone. For instance, compound B can be a mixture of from 50 mol-% such as 60 mol % to 80 mol-% or more, such as 90 mol % of at least one dichlorodiaryl sulfone and the remainder being at least one dichlorodiaryl ketone, such as 1 to 3, whereby 1 or 2, in particular one dichlorodiaryl ketone may be preferred.

In case that the polyarylene ether copolymer is a polyarylene ether sulfone copolymer suitable compound B can especially be at least one, whereby one may be preferred, dichlorodiphenyl sulfone such as 4,4'-dichlorodiphenyl sulfone, 4,4'-difluorodiphenyl sulfone, 4,4'-dibromodiphenyl sulfone, bis(2-chlorophenyl) sulfones, 2,2'-dichlorodiphenyl sulfone, 2,2'-difluorodiphenyl sulfone, particular preference can be given to 4,4'-dichlorodiphenyl sulfone or 4,4'-difluorodiphenyl sulfone. If a polyarylene ether sulfone copolymer of the PESU type (see below) is sought compound B can be 4,4'-dichlorodiphenyl sulfone (DCDPS).

The polyarylene ether copolymer comprises aside from the at least one block i) at least one block ii) which comprises in polymerized form at least one polyalkylene oxide (compound C). While the at least one block ii) may comprise in polymerized form a mixture of two or more polyalkylene oxides it may be preferred that it comprises one polyalkylene oxide. Aside from compound C the at least one block ii) may comprise further constituents. The at least one block ii) may typically, and as it may be preferred, be composed substantially of compound C in polymerized form.

Compound C

Compound C generally can be a diol. Compound C generally can substantially consist of oxyalkylene units. Oxyalkylene units may also be termed alkylene oxide units in the following. Oxyalkylene units are, in a way which is known in principle, units of the general formula —$R^1$—O—. In this formula $R^1$ is a divalent aliphatic hydrocarbon radical which may also, optionally, have at least one further substituent. Said at least one substituent on the radical $R^1$ may comprise, in particular, one or more O-containing groups, such as one or more OH groups. Compound C may of course also comprise two or more different oxyalkylene units.

The oxyalkylene units may in particular be —$(CH_2)_2$—O—, —$(CH_2)_3$—O—, —$(CH_2)_4$—O—, —$CH_2$—CH($R^2$)—O—, —$CH_2$—$CHOR^3$—$CH_2$—O—, with $R^2$ being an alkyl group, especially C1 to C24 alkyl, or an aryl group, especially phenyl, and with $R^3$ being a group selected from the group consisting of hydrogen or C1 to C24 alkyl.

Compound C may also comprise further structural units, such as ester groups carbonate groups or amino groups, for example. They may additionally comprise the starter molecule or starter molecules used at the start of the polymerization of the polyalkylene oxide, or fragments thereof. Examples comprise terminal groups $R^2$—O—, where $R^2$ is as defined above.

It may be preferred that compound C comprises ethylene oxide units —$(CH_2)_2$—O—0 and/or propylene oxide units —$CH_2$—$CH(CH_3)$—O—, as main components, while higher alkylene oxide units, i.e. those having more than 3 carbon atoms, in particular more than 4 carbon atoms are present only in small amounts in order to finetune the properties. Compound C may be a random copolymer, gradient copolymer, alternating or block copolymer comprising ethylene oxide and propylene oxide units. The amount of higher alkylene oxide units generally does not exceed 10% by weight, preferably 5% by weight, based on the molecular weight (Mn) of compound C. Compound C may preferably comprising at least 50% by weight of ethylene oxide units, based on the molecular weight (Mn) of compound C, preferably 75% by weight, and more preferably at least 90% by weight of ethylene oxide units, based on the molecular weight (Mn) of compound C. It may be very particular preferred that compound C is a pure polyoxyethylene.

Compound C can be obtained in a manner known in principle or using methods which are principally known, for example, by polymerizing at least one alkylene oxide and/or cyclic ether having at least 3 carbon atoms and also, optionally, at least one further component. They may additionally be prepared by polycondensing at least one dialcohol and/or polyalcohol, suitable starter, and also, optionally, at least one further monomeric component.

Examples of the at least one suitable alkylene oxide comprise ethylene oxide and propylene oxide, 1-butene oxide, 2,3-butene oxide, 2-methyl-1,2-propene oxide (isobutene oxide), 1-pentene oxide, 2,3-pentene oxide, 2-methyl-1,2-butene-oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide, styrene oxide, or be formed from a mixture of oxides of industrially available raffinate streams. Examples of the at least one cyclic ether comprise tetrahydrofuran. The skilled worker makes an appropriate selection from among the monomers and further components in accordance with the desired properties of compound C and therefore block ii) and the polyarylene ether copolymer respectively. Thereby one of the desired properties of compound C is typically its hydrophilicity.

Compound C may also be branched or star-shaped. Compound C of this kind may be obtainable by using at least one starter molecule having at least 3 arms. Examples of suitable starter comprise glycerol, trimethylolpropane, pentaerythritol or ethylenediamine.

Compound C may be a polyalkylene oxide with a low number average of alkylene oxide units. The number average of alkylene oxide units can also be high, depending on the desired properties. It may be preferred that the polyalkylene oxide has a number average weight of from 200 to 20 000 g/mol. The number average molecular weight of the polyalkylene oxides can be determined by potentiometric titration using potassium hydroxide solution.

The polyarylene ether copolymer may optionally comprise compound D is at least one compound having two hydroxy groups and which is not compound A and not compound C.

Compound D

Compound D can be an aliphatic compound which is not a polyalkylene oxide or it can be an aromatic compound. Generally, compound D can preferably be an aromatic compound. It may for instance be a dihydroxy arylene sulfone or a dihydroxyarylene ketone. The following compounds are examples for compound D which may be preferred:

a dihydroxybenzene, especially hydroquinone and resorcinol;

a dihydroxynaphthalene, especially 1,5-dihydroxynaphthalene, 1,6-dihydroxynaphthalene, 1,7-dihydroxynaphthalene, and 2,7-dihydroxynaphthalene;

a dihydroxybiphenyl, especially 4,4'-biphenol and 2,2'-biphenol;

a bisphenyl ether, especially bis(4-hydroxyphenyl) ether and bis(2-hydroxyphenyl) ether;

a bisphenylpropane, especially 2,2-bis(4-hydroxyphenyl) propane, 2,2-bis(3-methyl-4-hydroxyphenyl)propane and 2,2-bis(3,5-dimethyl-4-hydroxyphenyl)propane;

a bisphenylmethane, especially bis(4-hydroxyphenyl) methane;

a bisphenyl sulfone, especially bis(4-hydroxyphenyl) sulfone;

a bisphenyl sulfide, especially bis(4-hydroxyphenyl) sulfide;

a bisphenyl ketone, especially bis(4-hydroxyphenyl) ketone;

a bisphenylhexafluoropropane, especially 2,2-bis(3,5-dimethyl-4-hydroxyphenyl)hexafluoropropane; and a bisphenylfluorene, especially 9,9-bis(4-hydroxyphenyl) fluorene.

Compound D may preferably be hydroquinone, resorcinol, dihydroxynaphthalene, especially 2,7-dihydroxynaphthalene, 4,4'-biphenol or a mixture thereof. Under certain aspects it may be advantageous that compound D is dihydroxydiphenyl sulfone While as compound D a mixture of two or more diols can be comprised in the polyarylene ether copolymer it may be preferred that only one is comprised, which may most preferably be hydrochinone or 4,4'-biphenol.

The polyarylene ether copolymer can comprise at least one tri- or higher functional compound (compound E).

Compound E

The at least one tri- or higher functional compound (compound E) which is comprised in the polyarylene ether copolymer is known to or if not known per se can be prepared by methods known to those skilled in art. Compound E can lead to a branched polyarylene ether copolymer. Thus, it may be a branching agent. While the polyarylene ether copolymer disclosed can be branched it is typically not crosslinked. In case it is crosslinked then mostly to a minor or very minor extend. Compound E may be a monomer or an oligomer. Compound E has three or more functional groups. The number of functional groups as well as their nature and the amount of compound E can influence the branching of the polyarylene ether copolymer. It is often preferred that the at least one compound E has 3 to 6, such functional groups. It may be more preferred that compound E has 3 or 4 functional groups if a less branched polyarylene ether copolymer is aimed at. If minor branching is desired it can be of particular advantage that the at least one compound E is a trifunctional compound. By way of the functional groups and depending on their nature the at least one tri- or higher functional compound can react with compounds, A, B, C, and if present compound D.

A typical suitable functional group is hydroxy, and which is capable of substitution under the condition of polyarylene ether copolymer manufacture. This can be advantageous if it is desired to control the branching by way of the differing reactivity of the functional groups. It is also possible that all functional groups of compound E are the same. These may show equal reactivity but depending on the chemical constitution of compound E said functional groups may still differ in their reactivity during a polymerization reaction. Hydroxy and/or chlorine groups may be preferred. Compound E which has 3 to 6, specifically 3 or 4 hydroxy and/or chlorine groups may by most preferred. It may be very preferable that compound E has three hydroxy groups, thus that it is a triol.

Compound E can be an aromatic compound. An aromatic compound may be preferred if the polyarylene ether copolymer is intended for the production of a high temperature resistant and/or sterilizable coating, film, fiber, foam, membrane or molded article.

As compound E of the type of aromatic compounds containing three or more than three hydroxy groups there may be mentioned: phloroglucin, 4,6-dimethyl-2,4,6-tri-(4-hydroxy-5 phenyl)-heptene-2 (trimeric isopropenylphenol), 4,6-dimethyl-2,4,6-(4-hydroxyphenyl)-heptane (hydrogenated trimeric isopropenyl phenol), 1,3,5-tri-(4-hydroxyphenyl)-benzene, 1,1,1-tris-(4-hydroxyphenyl)-ethane, 1,1,1-tris-(4-hydroxyphenyl)-propane, tetra-(4-hydroxyphenyl)-methane, 1,4-bis-(4', 4''-dihydroxytriphenyl)-methyl]-benzene and 2,2-bis-[4,4'-bis-(4-hydroxyphenyl)-cyclohexyl]-propane. Trivalent or more than trivalent phenols which can be prepared by the reaction of p-alkyl-substituted monophenols having unsubstituted o-positions with formaldehyde or formaldehyde-yielding compounds may also be suitable, such as, the trisphenol from p-cresol and formaldehyde—the 2,6-bis-(2'-hydroxy-5'-methylbenzyl)-4-methylphenol. Other examples of suitable aromatic compounds include 2,6-bis-(2'-hydroxy-5'-isopropyl-1-benzyl)-4-isopropenyl 1-phenol and bis-hydroxy-3-(2'-hydroxy-5'-methylbenzyl-5-methylphenyl]-methane.

1,1,1-trishydroxyphenyl ethane (THPE) may be of particular interest from the aspects of being an aromatic compound, its ease to react under the conditions of polyarylene ether copolymer manufacture and industrial availability. THPE can promote the progress of polymerization between compound A and compound B and may for this reason be very advantageous. Moreover, in a poylarylene ether copolymer for use in fields in which health safety aspects are of importance such as in contact with water, or liquids in food industry or in the medical field THPE may be advantageously employed.

For the purpose of varying the branching quality a mixture of different tri- or higher functional compounds can be comprised in the polyarylene ether copolymer. Thus, for instance 2 to 5, such as 2 to 4 tri- or higher functional compounds can be comprised. It may be preferred that 2 or 3 tri- or higher functional compounds are comprised. From an aspect of complexity of industrial production, it may be more preferred that two tri- or higher functional compounds, in particular only one tri- or higher functional compound are respectively is comprised.

The amount of compound E can vary. If too little thereof is comprised in general the molecular weight of the polyarylene ether copolymer remains in a range that may be too low for certain applications. In addition, the molecular weight build-up may occur not fast enough for efficient industrial production. A too high amount may lead to the formation of a gel like polyarylene ether copolymer. This may also not be desired from an aspect of the range of applicability of the polyarylene ether copolymer. Therefore, the polyarylene ether copolymer in the at least one block i) generally—if compound E is present—advantageously comprises from 0.5 to 5 mol % of compound E, such as 0.5 mol %, 1 mol %, 1.5 mol %, 2 mol %, 2.5 mol %, 3 mol %, 3.5 mol %, 4 mol %, 4.5 mol % or 5 mol % of compound E, based on the total amount of compounds A, C, D and E comprised in the polyarylene ether copolymer. Thereby, it may be preferred that it comprises from 0.5 to 4 mol % of compound E, based on the total amount of compounds A, C, D and E. It may be most preferred that it comprises from 0.1 to 3 mol % of compound E, based on the total amount of compounds A, C, D and E comprised in the polyarylene ether copolymer.

Polyarylene Ether Copolymer

The polyarylene ether copolymer is a polyarylene ether ketone copolymer or a polyarylene ether sulfone copolymer. Generally, a polyarylene ether ketone copolymer comprises in the at least one block i) —O— and —CO— groups which link arylene groups. A polyarylene ether ketone copolymer in the at least one block i) may comprise only —O— and —CO— groups. It is also possible that it comprises further groups, which link arylene groups. Examples for such further groups which link arylene groups are —S—, —NN— or alkylene groups. Thereby a polyarylene ether ketone copolymer which comprises a certain, preferably minor, amount of —$SO_2$— groups or a certain, preferably minor, amount of —$SO_2$— groups and at least one further group is included in the disclosure. In this case the at least one block i) comprises less than 50 mol-% of the theoretically possible —CO— groups present in the at least one block i) are replaced by —$SO_2$— groups. Generally, not more than about 30 to 40 mol-% of the theoretically possible —CO— groups present in the at least one block i) are replaced by —$SO_2$— groups. If present in the at least one block i) typically 1 mol-% or more, preferably 5 mol-% or more of the theoretically possible —CO— groups present in the at least one block i) can be replaced by —$SO_2$— groups. Thus, for instance from 1 to 20 mol-% of the theoretically possible —CO— groups present in the polyarylene ether ketone copolymer in the at least one block i) can be replaced by —$SO_2$— groups.

Likewise, a polyarylene ether sulfone copolymer may in the at least one block i) comprise only —O— and —$SO_2$— groups which link arylene groups. It is also possible that it comprises further groups, which link arylene groups. Groups such as —S—, —NN— or alkylene groups can be mentioned as examples thereof. Thereby a polyarylene ether sulfone copolymer which comprises in the at least one block i) a certain amount of —CO— groups or a certain amount of —SO$_2$— groups and at least one further group is included in the disclosure. In this case less than 50 mol-% of the theoretically possible —SO$_2$— groups present in the at least one block i) are replaced by —CO— groups. Generally, not more than about 30 to 40% of the theoretically possible —SO$_2$— groups present in the at least one block i) are replaced by —CO— groups. If present in the at least one block i) typically 1 mol-% or more, preferably 5 mol-% or more of the theoretically possible —SO$_2$— groups present in the polyarylene ether sulfone may be replaced by —CO— groups. Thus, for instance from 1 to 20 mol-% of the theoretically possible —SO$_2$— groups present in the polyarylene ether sulfone in the at least one block i) may be replaced by —CO— groups.

It may be preferred that the polyarylene ether copolymer in the at least one block i) comprises at least one unit of the general formula I (unit U1)

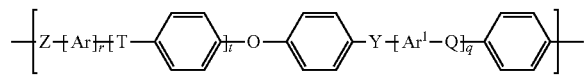

where the definitions of the symbols t, q, Q, T, Y, Ar and Ar$^1$ are as follows:
r: 0, or 1
t, q: independently of one another 0, or 1, or 2, or 3,
Q, T, Y: independently of one another in each case a chemical bond or group selected from —O—, —S—, —SO$_2$—, S=O, C=O, —N=N—, and —CR$^a$R$^b$—, where R$^a$ and R$^b$ independently of one another are in each case a hydrogen atom or a C1 to C12-alkyl, C1 to C12-alkoxy, C3 to C12-cycloalkyl, or C6 to C18-aryl group, and where at least one of Q, T, and Y is —SO$_2$— or —CO—,
Z: a group derived from ISOSO, ISOMA or ISOID
Ar and Ar$^1$: independently of one another an arylene group having from 6 to 18 carbon atoms.

If, within the abovementioned preconditions, Q, T or Y is a chemical bond, this then means that the adjacent group on the left-hand side and the adjacent group on the right-hand side are present with direct linkage to one another via a chemical bond.

However, it may be preferable that Q, T, and Y in formula I are selected independently of one another from —O— and —SO$_2$—, with the proviso that at least one of the group consisting of Q, T, and Y is —SO$_2$—.

If Q, T, or Y is —CR$^a$R$^b$—, R$^a$ and R$^b$ independently of one another are in each case a hydrogen atom or a C1 to C12-alkyl, C1 to C12-alkoxy, or C6 to C18-aryl group.

It may be preferred that C1 to C12-alkyl comprises linear and branched, saturated alkyl groups having from 1 to 12 carbon atoms. The following moieties may be mentioned in particular: C1 to C6-alkyl moiety, e.g. methyl, ethyl, n-propyl, isopropyl, n-butyl, sec-butyl, 2- or 3-methylpentyl, and longer chain moieties, e.g. unbranched heptyl, octyl, nonyl, decyl, undecyl, lauryl, and the singly branched or multi-branched analogs thereof.

Alkyl moieties that can be used in the abovementioned C1 to C12-alkoxy groups are for instance the alkyl moieties defined above having from 1 to 12 carbon atoms.

C3 to C12-cycloalkyl may in particular comprise C3 to C8 cycloalkyl, e.g. cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and Ar$^1$ are independently of one another a difunctional C6 to C18-arylene group. Proceeding from the starting materials described above or below respectively, Ar may preferably derive from an electron-rich aromatic substance that is very susceptible to electrophilic attack, whereby it may be hydroquinone, resorcinol, dihydroxy-naphthalene, in particular, it may be 2,7-dihydroxynaphthalene, or 4,4'-biphenol. Ar' may preferably be an unsubstituted difunctional C6- or C12-arylene group.

It may particularly be preferred that the difunctional C6 to C18-arylene groups Ar and Ar$^1$ are phenylene groups, and independently of one another e.g. 1,2-, 1,3-, and 1,4-phenylene, naphthylene groups, e.g. 1,6-, 1,7-, 2,6-, or 2,7-naphthylene, or also the difunctional arylene groups that derive from anthracene, from phenanthrene, or from naphthacene.

It may be preferable that Ar and Ar$^1$ are independently of one another 1,4-phenylene, 1,3-phenylene, naphthylene, in particular 2,7-dihydroxynaphthylene, or 4,4'-biphenylene.

It may be preferred that the polyarylene ether copolymer comprises in the at least one block i) at least one of the following repeat units U1 of formula Ia to Id:

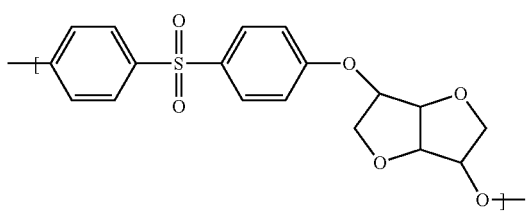

(Ia)

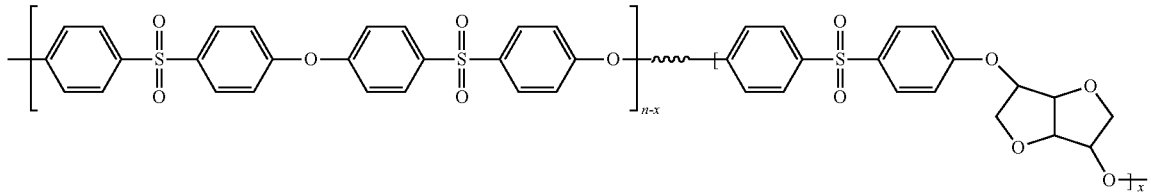

(Ib)

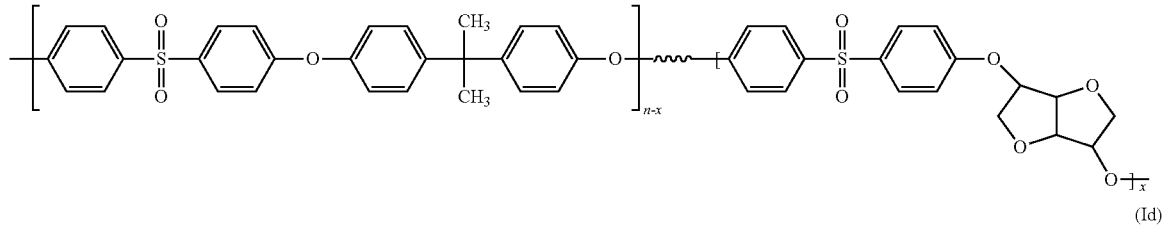
(Ic)

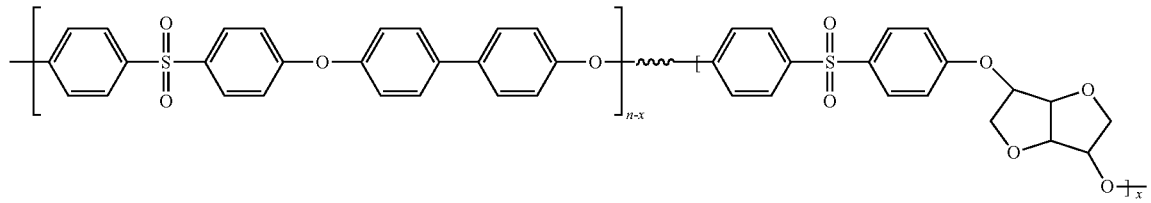
(Id)

wherein x is from 0.05 to 1, n is 1. Units U1 may be comprised in a statistical manner in block i).

The polyarylene ether copolymer may particularly preferably have in the at least one block i) repeat units U1 where Ar is 1,4-phenylene, t is 1, q is 0, T and Y are $SO_2$. This polyarylene ether copolymer may be termed a polyether sulfone (PESU) type polyarylene ether (formula Ia or Ib respectively).

The polyarylene ether copolymer may particularly preferably have in the at least one block i) repeat units U1 where Ar is 1,4-phenylene, t is 1, q is 0, T is $C(CH_3)_2$, and Y is $SO_2$. This polyarylene ether copolymer may be termed a polysulfone (PSU) type polyarylene ether (formula Ic).

The polyarylene ether copolymer may particularly preferably have in the at least one block i) repeat units U1 where Ar is 1,4-phenylene, t is 1, q is 0, T is a chemical bond, and Y is $SO_2$. This polyarylene ether copolymer may be termed a polyphenylene sulfone (PPSU) type polyarylene ether (formula Id).

For the purposes of the present disclosure, abbreviations such as PPSU, PESU, and PSU are in accordance with DIN EN ISO 1043-1:2001.

Optionally the polyarylene ether copolymer may in the at least one bock i) comprise at least one additional repeat unit U2. It is also possible that optionally the polyarylene ether copolymer may comprise at least one additional block iii) consisting of the at least one repeat unit U2. Said at least one repeat unit U2 can preferably be of formula IIa to IIo below:

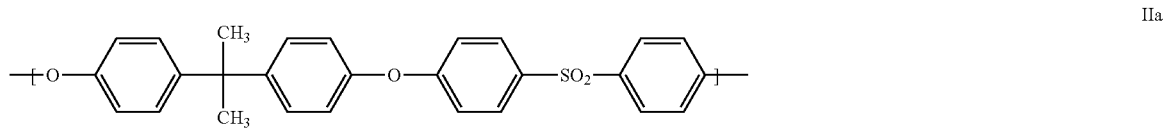
IIa

IIb

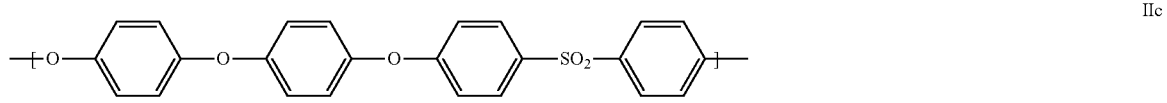
IIc

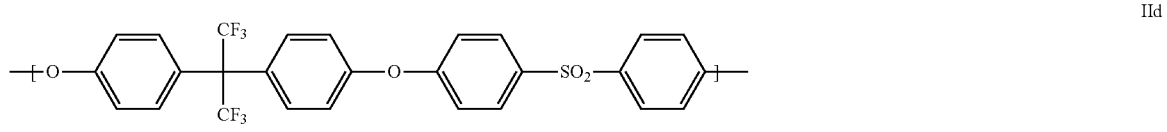
IId

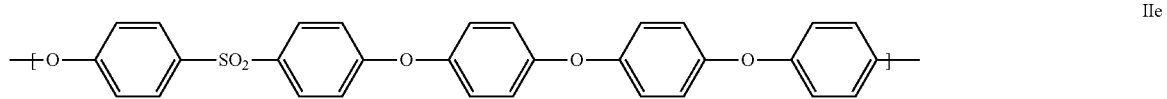
IIe

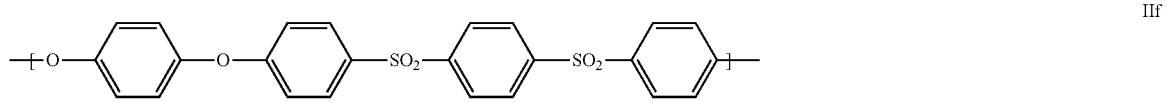
IIf

-continued

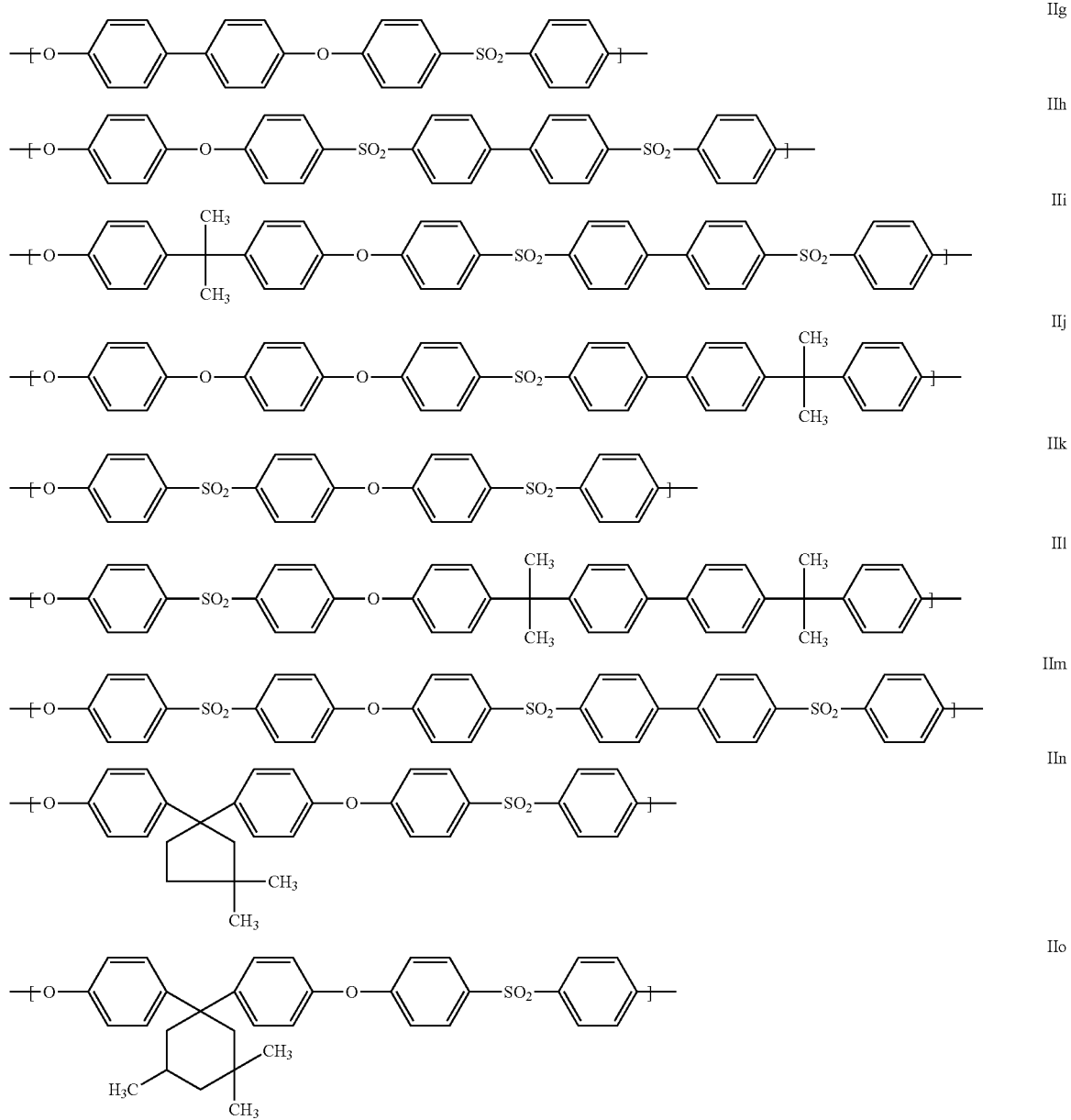

Unit U2 of the general formula II that may particularly preferred are units IIa, IIg and/or IIk. Units U2 may be comprised in a statistical manner in block i).

The at least one block i) preferably may have a mean molecular weight Mn (number average) in the range from 2000 to 70000 g/mol, especially preferably 5000 to 40000 g/mol and particularly preferably 7000 to 30000 g/mol. The average molecular weight of the at least one block i) can be controlled and calculated by the ratio of the monomers forming the at least one block i), as described by H. G. Elias in "An Introduction to Polymer Science" VCH Weinheim, 1997, p. 125.

The polyarylene ether copolymer which comprises compound E comprises at least one unit U3. This can—and this may be preferred—be derived from a unit U1 and compound E.

The person skilled in the art will appreciate that the at least one unit U3 structurally incorporates unit U1 as described above as well as compound E as described above in any of the possible combinations thereof.

Therefore, the molecular structure of the polyarylene ether copolymer comprising repeat units U3 can for instance for a PESU type polyarylene ether copolymer be schematically represented as comprising in the at least one block i) units of formula VIa and/or VIb:

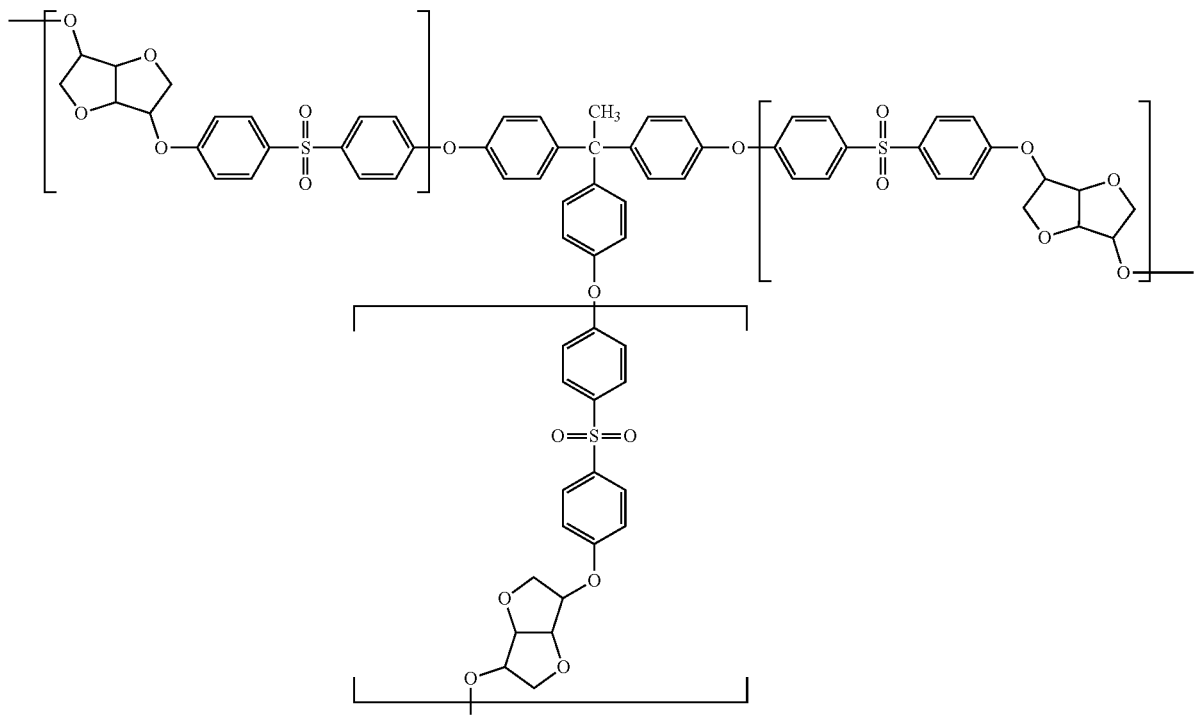
(VIa)

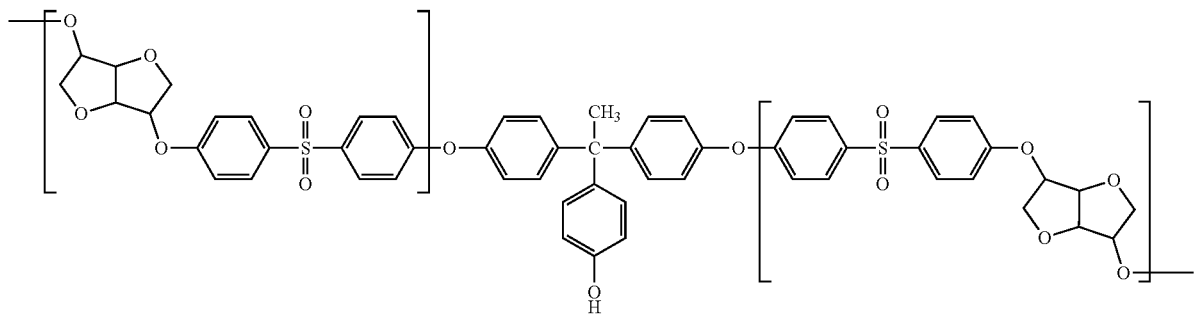
(VIb)

The person skilled in the art will appreciate that the molar ratios of the at least one unit U1 and the at least one unit U3 will depend on the amounts of compound E. Units U3 may be comprised in a statistical manner in block i).

All of the at least one block ii) that is comprised in the polyarylene ether copolymer can consist of in polymerized form a homopolymer of one alkylene oxide, preferably polyethylene oxide.

It is also possible that all or a number of the at least one block ii) consist of in polymerized form compound C which is a segmented copolymer comprising blocks of ethylene oxide and at least one block of propyleneoxide, butyleneoxide or tetrahydrofurane.

All of the at least one blocks ii) may be endcapped on one side with an alkyl or aryl group, leading to a polyarylene ether copolymers of the general structure X-PAO or PAO-X-PAO, wherein X stand for a block i) and PAO stands for block ii).

It is possible that a block ii) bears an OH group in both terminal positions, leading to polyarylene ether copolymer that may comprise multiple blocks ii) in one polymer molecule.

It may be preferred that, the at least one block ii) comprises segments of polyethylene oxide (PEO) at the terminal positions, whereas segments of polyalkylene oxides different from ethylene oxide like polypropylene oxide (PPO), polybutylene oxide (PBO) and poly-THF (pTHF) are preferably comprised in central positions. It may be preferred that the at least one, whereby it may be preferred that all block ii) has the structure PEO-PPO-PEO, PEO-PBO-PEO or PEO-pTHF-PEO.

The chain length of the at least one block ii) can vary in wide ranges and generally depends on the balance between hydrophilicity of the polyarylene ether copolymer and reactivity of compound C in the polycondensation reaction.

The at least one block ii) can for instance comprise a number average from 1.1 to 500 alkyleneoxide units. It may be preferred, that the at least one block ii) comprise from 2 to 300, more preferably from 3 to 150, even more preferably from 5 to 100 and especially preferably from 10 to 80 alkylene oxide units.

The polyaryene ether copolymer can for instance preferably comprise at least one block ii) of the general formula (III), (IV) or (V) or a mixture thereof, whereby a mixture may not be preferred:

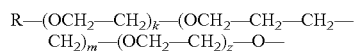

(III),

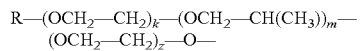

(IV),

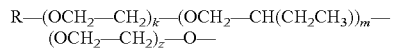

(V), wherein
R denotes hydrogen or an aliphatic or aromatic rest or a chemical bond,
wherein the number average of k and z over all block ii) according to the respective formula III, IV or V and bearing the same rest R present in the block copolymer is independently from 1.1 to 40;
and wherein the number average of m over all blocks ii) according to the respective formula III, IV or V and bearing the same rest R present in the polyarylene ether copolymer is 10 to 500.

It may be preferable that, the number average of k and z over all of the at least one block ii) present in the polyarylene ether copolymer is identical or differs by not more than 0.5 or even more preferably 0.1.

The nature of the end groups of the polyarylene ether copolymer is not particularly limited. Generally, it may depend on if reactive or non-reactive end groups are desired as end groups. Reactive end groups may for instance be preferred if it is intended to polymerize the polyarylene ether copolymer with at least one further monomer or polymer to yield a copolymer such as a block copolymer or a polymer network. Possible end groups are phenolic OH end groups or phenolate end groups, phenolic alkoxy end groups, among which —$OCH_3$ end groups may be preferred, amino end groups, among which —$NH_2$ may be preferred or chlorine end groups. It is also possible that the end groups are phenolic anhydride end groups. The end groups can be of one type or can be different from each other. Generally, it may be preferred that the end groups are Cl—, OH— and/or —$OCH_3$. Often inert end groups are accessible by endcapping reactive endgroups. In the case that the polyarylene ether copolymer is intended for an application which is accessible by a method of production through solution, such as solution spinning or casting from solution, endcapping may not be required. A polyarylene ether copolymer which is not endcapped may in particular be useful in conjunction with membrane production. In this case a polyarylene ether copolymer which has Cl and/or OH end groups may be advantageous.

The polyarylene ether copolymer can preferably have a relative viscosity of 0.20 to 1.30 dl/g, especially of 0.30 to 0.95. According to the solubility of the polyarylene ether copolymer, the relative viscosity can be measured in 1% by weight N-methylpyrrolidone solution, in mixtures of phenol and dichlorobenzene, or in 96% sulfuric acid, in each case at 20° C. or 25° C.

The polyarylene ether copolymer can preferably have a mean molecular weight Mn (number average) in the range from 2000 to 75 000 g/mol, especially 5000 to 45 000 g/mol, determined by GPC.

The weight-average molar mass Mw of the polyarylene ether copolymer may preferably be from 10 000 to 200 000 g/mol, in particular it may be from 15 000 to 150 000 g/mol and it may be particularly preferably be from 18 000 to 100 000 g/mol, determined by means of gel permeation chromatography in dimethylacetamide as solvent against narrowly-distributed polymethyl methacrylate as standard (calibration between 800 to 1820000 g/mol), using 4 columns (pre-column, 3 separation columns based on polyester copolymers) operated at 80° C. The flow rate was set to 1 ml/min, injection volume was 100 µl. Detection was done using an RI-detector.

The polyarylene ether copolymer disclosed can advantageously be prepared by a process which comprises reacting
a) isosorbide, isomannide, isoidide or a mixture thereof (compound A) and
b) at least one difunctional compound comprising a dichlorodiaryl sulfone, a dichlorodiaryl ketone or a mixture thereof (compound B)
with
c) at least one polyalkylene oxide (compound C).

The process disclosed can also comprise that compounds A, B and D is reacted with compound C. It is also possible that the process comprises reacting compounds A, B and E with compound C. Further it is possible that the process comprises reacting compounds A, B, D and E with compound C. Preference is mostly given to a process comprising reacting compounds A and B with C, or comprising reacting compounds A, B and E with compound C.

Generally, monomeric compounds A, B, and if present D and/or E are employed as starting compounds, which means that the reaction generally does not start from the prepolymers of compounds A, B, and if present D and/or E. Compound C is in the process employed as oligomeric or polymeric starting compound.

The starting compounds enter into a polycondensation reaction to give the polyarylene ether copolymer which can typically be carried out in the presence of at least catalytic amounts of a base. It may be carried out in the absence or as it may be preferred the presence of a solvent L. A reaction mixture is formed. The components of the reaction mixture are generally reacted concurrently. The individual components may be mixed in an upstream step and subsequently be reacted. It is also possible to feed the individual components into a reactor in which these are mixed and then reacted. It may be preferred that the reaction is carried out in one stage. This means that the deprotonation of compound A and if present compound D as well as compound B and if present E which carry OH groups and also the condensation reaction thereof with compound C takes place in one single reaction stage without isolation of the intermediate products.

The preparation of polyarylene ethers with simultaneous control of the end groups is in general known to those skilled in the art and is more specifically described in detail below. For polyarylene ether copolymers it can for instance be achieved by the control of the amounts of functional groups of compounds A, B, C and if present D and/or E which they have prior to being polymerized, that is to say as starting compounds. The ratios of the starting compounds to be used derive in principle from the stoichiometry of the polycondensation reaction which proceeds with theoretical elimination of hydrogen halide, such as hydrogen chloride, and are established by the person skilled in the art in a known manner.

It is generally preferred that the molar ratios of the functional groups of the starting compounds which are reactive towards each other are controlled or adjusted. Thus, the molar ratios of chlorine groups and the functional groups which are reactive towards chlorine—such as in many cases hydroxy groups—can vary, depending on factors such as control of end groups or control of reaction speed and molecular weight. It can be equimolar. In the alternative the molar ratio of the chlorine groups can be higher than that of the functional groups which are reactive towards chlorine—such as in many cases hydroxy groups—or vice versa. Thus, for instance the molecular weight of a polyarylene ether copolymer which is a polyarylene ether sulfone copolymer comprising phenolate end groups can be adjusted using a defined off-set of the stoichiometric ratio between the starting compounds A and C over compound B. Generally the molar ratios are not more than about 3:1 to about 1:3, such as about 2:1 to about 1:2. With respect to obtaining higher molecular weights the molar ratios are mostly nearer equal molecular ratios.

As disclosed above compounds E and D may have functional groups which are reactive towards chlorine. Compound E may also have chlorine functional groups. Likewise, compound B has two chlorine groups or may have one chlorine group and one group reactive towards chlorine. Thus, the ratio of the starting compounds and with them those of the functional groups have to be chosen accordingly.

For instance, to increase the number of phenolic OH end groups, an excess of OH end groups is preferable. It can be preferred that, the ratio of chlorine end groups to phenolic OH end groups is adjusted by controlled establishment of an excess of starting compound with hydroxy functional groups. On a molar basis the ratio of OH groups to chlorine groups may in this case be from 1.005 to 1.2, especially from 1.01 to 1.15, most preferably from 1.02 to 1.1.

In cases in which more stable end groups are sought it may be preferred to increase the number of chlorine end groups, in particular phenylchlorine, whereby an excess of chlorine end groups is preferable. In a preferred embodiment, the ratio of functional groups and groups, such as preferred in many cases hydroxy, to chlorine end groups is adjusted by controlled establishment of an excess of chlorine containing compounds. Preferably in this case, on a molar basis the ratio of chlorine to OH groups may be from 1.005 to 1.2, especially from 1.01 to 1.15, most preferably from 1.02 to 1.1.

Preferably, the conversion in the polycondensation is at least 0.95, which ensures a sufficiently high molecular weight.

In principle the process can be carried out in the absence of a solvent. In particular, in cases in which a very light color of the polyarylene ether copolymer is aimed at, the process can mostly more advantageously be carried out in the presence of at least one solvent (solvent L).

Solvent L which may be preferred in the context of the present invention is an organic, especially aprotic polar solvent. Suitable solvent L can also have a boiling point in the range from 80 to 320° C., especially 100 to 280° C., preferably from 150 to 250° C. A suitable aprotic polar solvent is, for example, a high-boiling ether, ester, ketone, asymmetrically halogenated hydrocarbon, anisole, dimethylformamide, dimethyl sulfoxide, sulfolane, dimethylacetamide (DMAC), N-methyl-2-pyrrolidone (NMP) or N-ethyl-2-pyrrolidone (NEP) or any combination thereof. To enhance solubility solvent L can for instance be a mixture of 2 to 3 solvents. In most cases it can be sufficient to use two or more preferably only one solvent.

Solvent L may especially be DMAC, NMP or NEP or any mixture thereof.

Preferably, the process comprises reacting compounds A, B, C and if present D and/or E, in at least one aprotic polar solvent mentioned, such as in DMAC, NMP or NEP or any mixture thereof, where especially N-methyl-2-pyrrolidone may be preferred. Thereby it may be preferable to proceed from a mixture of starting compounds A, B, C and if present D and/or E. To modify the formation of the block in the polyarylene ether copolymer it is of course also possible to add certain compound A, B, C and if present D and/or E at various times during the reaction. It may in particular be preferred starting from a mixture of one compound A, one compound B and one compound C or with a mixture of one compound A, one compound B, one compound C and one compound E in at least one aprotic polar solvent, such as in DMAC, NMP or NEP or any mixture thereof, whereby NMP may be especially preferred.

To separate the water released during the reaction an azeotrope-forming co-solvent like toluene or chlorobenzene may be used. Typically, it may be preferred not to employ such azeotrope-forming co-solvent. Separation of the water together with the solvent L during the heating process may generally be preferred. Loss of solvent L can be accounted for by for instance starting with a larger amount of solvent L or by adding solvent L during the reaction. The control of the viscosity increase during the reaction can also be a means to control the molecular weight of the polyarylene ether copolymer.

The process disclosed may in general comprise that compounds A, B, C and if present D and/or E are reacted in the presence of at least one base. The person skilled in the art is aware that functional groups such as OH groups, for instance phenolic OH groups are preferably reacted in the presence of at least one base in order to increase the reactivity toward chlorine substituents of compound B.

Said at least one base can typically be a hydroxide, carbonate or bicarbonate. Thus, it may be a mixture of at least one hydroxide and at least one carbonate or a mixture of at least one carbonate with at least one bicarbonate. Thereby at least one anhydrous alkali metal carbonate may be preferred. It may also be possible to for instance use a mixture of different hydroxides or different carbonates or different bicarbonates. It may be preferred to use one base. It may be preferred that the one base is one alkali metal carbonate. In particular, sodium carbonate, potassium carbonate, calcium carbonate, or a mixture thereof may be preferred, very particularly it may be preferred that potassium carbonate is used as the base. From the aspect of reaction speed and if a very light colored polyarylene ether copolymer is aimed at especially potassium carbonate with a volume-weighted mean particle size of less than 100 micrometers, for instance from 5 to 80 μm, preferably from 10 to 60 μm, such as 20 μm, 25 μm, 30 μm, 35 μm, 40 μm, 45 μm, 50 μm or 55 μm or any uneven nm size between 5 to 100 μm, determined at a suspension of the solid in chlorobenzene/sulfolane 60/40 using a Malvern Mastersizer 2000 instrument.

A combination which can be particularly preferred is DMAC, NMP or NEP or any mixture thereof as solvent and potassium carbonate as base, especially potassium carbonate of a size of less than 100 μm. One combination which can be particularly preferred is NMP as solvent and potassium carbonate as base, especially potassium carbonate of a size of less than 100 μm, for instance from 5 to 80 μm, preferably from 10 to 60 μm, such as 20 μm, 25 μm, 30 μm, 35 μm, 40 μm, 45 μm, 50 μm or 55 μm or any uneven nm size between 5 to 100 μm, determined as described above.

The reaction of compounds A, B, C and if present D and/or E can be performed at a temperature at which the reaction proceeds with an acceptable speed and yields a polyarylene ether copolymer in an acceptable quality such as having the molecular weight and the molecular weight distribution as desired. Generally, the process can be carried at out at temperatures of from 80 to 250° C., preferably from 100 to 220° C. When the process is carried out in the presence of solvent L and ambient pressure the upper temperature limit is usually determined by the boiling point of solvent L. In particular, when the process is carried out in the absence of a solvent the stability of the reactants can be a factor limiting the reaction temperature.

While the person skilled in the art may adapt the reaction temperatures and times to the specific polyarylene ether copolymer to be produced, reaction temperatures in the range of from 180 to 205° C. may be applicable and temperatures from 185 to 195° C. may be preferred. At the latter temperatures the reaction may take from 2 to 20 hours, e.g. from 3 to 18 hours, for instance from 5 to 15 hours. In particular, if the process is carried out in solvent L, such as NMP said conditions may be the preferred ones.

It may be possible to employ in the process at least one compound with one functional group reactive towards reactive groups comprised in a polymeric chain (compound F). Compound F It may be preferred that one compound F is used. Thereby it may be possible to control the chain length of the polyarylene ether copolymer. Generally, a reaction with compound F following the polycondensation reaction for instance after a conversion of at least 0.9 is reached may be preferred. It may be preferred that compound F is at least one aliphatic organic halogen. The result is further reaction of reactive groups, which can be endgroups, in particular hydroxy end groups.

The polyarylene ether copolymer then comprises in reacted form compound F. Such polyarylene ether copolymer is usually stabilized inter alia against further extension of the polymer chain during the course of further processing.

Preferred at least one aliphatic organic halogen compound is at least one alkyl halide, in particular alkyl chloride, having linear or branched alkyl groups having from 1 to 10 carbon atoms, which can in particular be a primary alkyl chloride, particularly preferably methyl halide, in particular methyl chloride.

The reaction with compound F can preferably be carried out at a temperature from 90° to 160° C., in particular from 100° C. to 150° C. The time can vary widely and is usually at least 5 minutes, in particular at least 15 minutes. The reaction time can generally preferably be from 15 minutes to 8 hours, in particular from 30 minutes to 4 hours.

Various methods can be used for the reaction of compound F, more specifically the at least one aliphatic organic halogen. The amounts used of compound F, more specifically the at least one aliphatic organic halogen compound, can moreover be stoichiometric or represent an excess, where the excess can by way of example be up to a 5-fold excess. For example, it may be preferred that the at least one aliphatic organic halogen is added continuously, in particular via continuous introduction in the form of a stream of gas.

Reaction with compound F can be carried out in a separate process unit or as it may be preferred directly in the polycondensation reactor.

If the process is carried out in the presence of solvent L and after the reaction is completed, further solvent L, which can for instance be the solvent L in which the reaction was carried out such as DMAC, NMP, NEP or any mixture thereof, whereby NMP may be preferred, is typically added to cool the reaction mixture down. The reaction mixture can for instance be cooled to the temperature range at which compound F can be reacted with the polyarylene ether copolymer in a separate process unit or the polycondensation reactor as described above. Thereafter, the reaction mixture may be further cooled if needed, whereby around 80° C. may be preferred. If the polyarylene ether copolymer is not reacted with compound F it may be preferred that the reaction mixture is cooled to around 80° C. At this temperature the reaction mixture, which typically is a dispersion, is taken out of the respective process unit, typically comprising a reaction vessel and is transferred into at least one separation unit. Said separation unit may preferably comprise a filtration unit to separate the salt formed during the reaction, e.g. potassium chloride from the reaction mixture. Depending on the viscosity of the dispersion, this process may take minutes or hours such as from 30 min to 24 h. During that time the filtrate may also let to cool down to ambient temperature (23° C.). The product may then be isolated, such as via precipitation due to addition of a non-solvent. This can for instance be a mixture of water and at least one polar aprotic solvent. It may be preferred to use a mixture of water and a solvent L, such as DMAC, NMP, NEP or any mixture thereof, where by NMP may be preferred. Thereby the water can generally be used in portions greater than the solvent L such as DMAC, NMP, NEP or any mixture thereof, whereby NMP may be preferred. Precipitation in a water/NMP-mixture (e.g. around 80/20 by weight) may be most preferred. The precipitation can also be in an acidic medium, such as in a water/NMP-mixture comprising an acid. Suitable acids are for example organic or inorganic acids for example carboxylic acid such as acetic acid, propionic acid, succinic acid or citric acid and mineral acids such as hydrochloric acid, sulfuric acid or phosphoric acid. The obtained powder is collected, typically filtered, and then typically washed and finally dried, whereby temperatures from 80 to 150° C. in the vacuum can be used.

In addition to the disclosure above the person skilled in the art can resort to methods accessible to him by application of his general knowledge. Production processes that lead to a polyarylene ether sulfone are described by way of example in Herman F. Mark, "Encyclopedia of Polymer Science and Technology", third edition, volume 4, 2003, chapter "Polysulfones" pages 2 to 8, and also in Hans R. Kricheldorf, "Aromatic Polyethers" in: Handbook of Polymer Synthesis, second edition, 2005, pages 427 to 443. More details regarding the synthesis of OH-terminated polyarylene ether sulfones are for instance given in R. Viswanathan, B. C. Johnson, J. E. McGrath, Polymer 25 (1984) 1827. Information on the control of the molecular weight are for instance disclosed in A. Noshay, M. Matzner, C. N. Merriam, J. Polym. Sci. A-1 9 (1971) 3147.

The process disclosed herein has the general advantage that the incorporation rate of compound A into the polyarylene ether copolymer is high or very high. Moreover, high molecular weight polyarylene ether copolymers are accessible without having to resort to fluorine containing monomers. Thus, the high molecular weight polyarylene ether copolymer can be produced more environementally friendly and also less expensive. In addition, the process is very efficient as the building up of the high molecular weight of the polyarylene ether copolymer occurs faster than that of comparable polymers. The polyarylene ether copolymer disclosed herein can in particular be used for the manufacture of membranes, namely as dope solutions. For industrial production of the manufacture of membranes it is for example an advantage that the time to dissolve the polyarylene ether copolymer for the production of a dope solution comprising the polyarylene ether copolymer is low.

Some examples of polyarylene ether sulfone copolymers and polyarylene ether ketone copolymers which are within this disclosure and which may be prepared according to the process described above and which may be among the preferred are given in Table 1 below

TABLE 1

| Polyarylene ether copolymer of the type | Compound A ISOSO [mol %] | Compound B [mol %] | Compound C [mol %] | Compound D [mol %] | Compound E [mol %] |
| --- | --- | --- | --- | --- | --- |
| PPSU | 5 to 98 | 98 to 102 | 1 to 10 | BP 1 to 94 | no |
| PPSU | 5 to 90.5 | 98 to 102 | 1 to 10 | BP 1 to 93.25 | 0.5 to 5 |
| PESU-ISOSO | 90 to 99 | 98 to 102 | 1 to 10 | no | no |
| PESU-ISOSO | 82.5 to 98.25 | 98 to 102 | 1 to 10 | no | 0.5 to 5 |
| PESU | 5 to 98 | 98 to 102 | 1 to 10 | DHDPS 1 to 94 | no |
| PESU | 5 to 90.5 | 98 to 102 | 1 to 10 | DHDPS 1 to 93.25 | 0.5 to 5 |
| PSU | 5 to 98 | 98 to 102 | 1 to 10 | BisA 1 to 94 | no |
| PSU | 5 to 90.5 | 98 to 102 | 1 to 10 | Bis A 1 to 93.25 | 0.5 to 5 |

The use of at least one polyarylene ether copolymer disclosed herein or obtainable by the process disclosed herein, for instance of the PPSU, the PESU or the PSU type, whereby it may be most preferable that the poylarylene ether copolymer comprises Isosorbide and DCDPS, in polymerized form for the production of coatings, fibers, films, foams, moldings and/or membranes is also disclosed herein. Copolymers with more than 5 wt % PAEO are typically suitable for the production of membranes or for additives for membranes.

A fiber is for example a more or less flexible structure which is thin in relation to the length. A fiber can be compact or hollow. A fiber can be round or almost round or can have a different cross-sectional shape. It can for instance be flat. A fiber can also be tubelike. A fiber may have a smooth surface or it may have pores or holes. A fiber can be obtained for example by an extrusion method. It may be more preferred that a fiber from at least one polyarylene ether copolymer, whereby generally one polyarylene ether copolymer is preferred, is obtained by a spinning method. Spinning from a solution can be advantageous if thermal stress on the at least one polyarylene ether copolymer is a concern. In a number of cases it can be advantageous to employ a solvent for the spinning which comprises or consists of solvent L, for example DMAC, NMP, NEP or any mixture thereof. In case the process is carried out in the presence of solvent L the spinning can for instance be carried out directly after the separation of the polyarylene ether copolymer from the salt. It is also possible to isolate the polyarylene ether copolymer first and then to dissolve it in the solvent to be used for the spinning. To improve the mechanical properties of a fiber it can be advantageous to spin the at least one polyarylene ether copolymer, whereby generally one polyarylene ether copolymer is preferred, which can be as it may be preferred—from solution by an electrospinning method, including magnetic electrospinning. Electrospinning may for instance be most preferred in case of the production of a fiber which is a nanofiber. Magnetic electrospinning may be employed for the production of nonwovens from the at least one polyarylene ether copolymer, whereby generally one polyarylene ether copolymer is preferred. As the electrospinning method requires that the melt or which may be preferred the solution is conductive it may not be necessary to separate the salt, all or essentially all of the salt from the reaction mixture after the reaction. A polyarylene ether copolymer which comprises compound A as sole diol aside from compound C may be preferred for the production of a fiber by an electrospinning method.

A membrane is for instance a separating layer. A membrane may be understood to mean an impermeable, partly impermeable or selectively permeable membrane, or a membrane which is permeable in one direction or a permeable membrane. The type of membrane is generally not restricted. The membrane can be a dense membrane which comprises virtually no pores and which in particular can be used for gas separation. It can be a porous membrane which comprises pores having a diameter in the range from 1 to 10000 nm and which is mainly used in micro-, ultra- and nanofiltration. Thus, the membrane may for instance be a reverse osmosis (RO) membrane, a forward osmosis (FO) membrane, a nanofiltration (NF) membrane, an ultrafiltration (UF) membrane or microfiltration (MF) membrane. In many cases it may be preferred that the membrane is an UF, a NF or a MF membrane.

The polyarylene ether copolymer disclosed herein can be used in different filter membrane geometries. For instance, it can be used in a flat membrane and/or in a capillary-like hollow fiber membrane. The flow toward these membranes may take the form of a dead-end flow or of a crossflow.

The membrane may be produced using at least one polyarylene ether copolymer, whereby it can be preferred that it is produced from one polyarylene ether copolymer. Typically, the membrane can be prepared according to methods known to those skilled in the art. The membrane may for instance be manufactured by casting from a solution. Thereby a casting solution of at least one polyarylene ether copolymer in a solvent L, such as DMAC, NMP, NEP or any mixture thereof, whereby NMP may be preferred, can be prepared. Dimethyl lactamide may also be preferred as solvent L. Said casting solution typically contains at least one, as is preferred in many cases one, compound which can be removed by washing from the membrane. Said compound is often also termed as pore former. For the purposes of the manufacture of the membrane from at least one polyarylene ether copolymer, polyvinylpyrrolidone and/or polyethylene glycol (PEG) can often be used as pore former in a casting solution.

The membrane can be used in contact with water, a body fluid or a liquid in food production. Likewise, the membrane ca be use for gas-separation.

Thus, the membrane can be used in conjunction with water processing such as separation of solids or medical technology. In the medicinal or industrial fields, the membrane can for instance be used for the recovery of vaccines or antibiotics from fermentation broth, laboratory grade water purification, water disinfection—including removal of viruses, removal of endocrins or pesticides. The membrane can be for instance be used in conjunction with blood treatment such as dialysis. It can for instance be employed for the manufacture of blood treatment devices.

A liquid in food production can for instance be a beverage which may be cleared by a membrane disclosed herein, such as an alcoholic or non-alcoholic beverage such as a fruit juice or beer. Likewise, the membrane may be used in the processing of milk or products derived from milk.

The polyarylene ether copolymer can be used for the manufacture of a dope solution which is used in the manufacture of membranes. A dope solution is typically used in the manufacture for membranes to control or influence the membranes properties, such as hydrophilicity or structure. It can therefore for instance be employed in small amounts or very targeted. Such dope solution can comprise at least one polyarylene ether copolymer. Usually the dope solution comprises only one or two, preferably one polyarylene ether copolymer. The dope solution can comprise any polyarylene ether copolymer disclosed herein or obtainable by the process disclosed herein, for instance of the PPSU, the PESU or the PSU type, whereby it may be most preferable that the poylarylene ether copolymer comprises Isosorbide and DCDPS, in polymerized form. Thereby copolymers with more than 5 wt % PAEO are usually preferred. The dope solution generally comprises a solvent which allows to dissolve the polyarylene ether copolymer and which does not interfere with or purposefully interferes in the manufacture of a membrane. A solvent L, such as DMAC, NMP, NEP or any mixture thereof, whereby NMP may be preferred.

An article comprising at least one membrane can for instance be a filtration system such as a dialysis filter apparatus, a module row or a module rack.

A molded article can essentially be a solid geometric body which can be produced, for example, by molding processes, injection molding, extrusion, calendering, rotomolding, foaming, blow-molding processes, forming processes or joining processes.

EXAMPLES

The examples below provide further explanation of the invention, but do not restrict the same.

Definitions and Abbreviations

Reaction time: time during which the reaction mixture was kept at 190° C.
CA contact angle
DCDPS: 4,4'-dichlorodiphenylsulfone
DMAC: dimethylacetamide
ISOSO: isosorbide
NMP: N-methyl-2-pyrrolidone
PEO polyethylene oxide
PESU 1 polyarylene ether sulfone polymer with a viscosity number 84.0 ml/g, a Tg of 226° C. and a Mw of 75 000 GPC g/mol (in DMAC, polymethylmethacrylate standard) (Ultrason® E 6020 BASF SE)
PVP: polyvinylpyrrolidone
PEG: polyethylene glycole PWP pure water permeation
MWCO molecular weight cut off The particle size of the potassium carbonate was determined at a suspension of the solid in chlorobenzene/sulfolane 60/40 using a Malvern Mastersizer 2000 instrument.

Isolation and Testing of the Copolymers

The copolymers obtained were isolated by dividing the filtrated reaction mixture into droplets and transferring the droplets into a precipitation bath. The precipitation solvent was desalinated water at room temperature. The precipitation height was 0.5 m. The throughput was appr. 2.5 l/h. The so obtained beads were then extracted with water at 85° C. for 20 h (water throughput 160 l/h). Thereafter the beads were dried under reduced pressure at a temperature below the glass transition temperature (Tg) to a residual moisture of less than 0.5 wt %.

The solution viscosity (V.N.) was determined using a solution of 0.01 g/ml polymer in NMP at 25° C. (DIN EN ISO 1628-1 (October 2012)).

The content of isosobide and polyethylene oxide in the polyarylene ether copolymers was determined by $^1$H-NMR analysis on a $CDCl_3$ solution.

The Tg of the copolymers was determined by DSC-measurement with a heating rate of 10 k/min in the second heating process.

The contact angle (CA) of the polymers were measured against water on the respective polymer films, which were manufactured from a 25 wt % solution in NMP. The films were dried under reduced pressure at 80° C. for 48 hours. The measurements were carried out at 23° C. with a DSA 100 analyzer (from Krüss GmbH). The values given in Table 2 are average values from 10 measurements.

Examples 1 to 4 According to the Invention—Preparation of Polyarylene Ether Copolymers and Comparative Example C1—Preparation of a Polyarylene Ether General Procedure:

In a vessel equipped with a stirrer, Dean-Stark-trap, nitrogen-inlet and temperature control, DCDPS, ISOSO, (and if present) PEO and potassium carbonate (volume average particle size of 9.5 μm) were suspended under nitrogen atmosphere in NMP. Under stirring the mixture was heated up to 190° C. within one hour. The water that was formed in the reaction was continuously removed by distillation. Potential solvent loss to be accounted for was monitored. Nitrogen is purged through the mixture and the mixture is kept at 190° C. for the reaction time. After this time 1950 ml NMP were added to cool down the mixture to room temperature (within one hour) under nitrogen. To remove the potassium chloride formed the reaction mixture was filtrated. The obtained polymer solution was then precipitated in water, the resulting polymer beads were separated and then extracted with hot water (85° C.) for 20 h. Then the beads were dried at 120° C. for 24 h at reduced pressure (<100 mbar). The amounts and materials employed as well as the properties are given in Table 2 below:

TABLE 2

| Examples | 1 | 2 | 3 | 4 | C1 |
|---|---|---|---|---|---|
| DCDPS | | | | | |
| [g] | 580.063 | 580.063 | 580.063 | 580.063 | 435.047 |
| [mol] | 2.02 | 2.02 | 2.02 | 2.02 | 1.515 |

TABLE 2-continued

| Examples | 1 | 2 | 3 | 4 | C1 |
|---|---|---|---|---|---|
| ISOSO | | | | | |
| [g] | 283.43 | 283.50 | 286.43 | 283.50 | 219.21 |
| [mol] | 1.96 | 1.94 | 1.96 | 1.94 | 1.50 |
| PEO | | | | | |
| Mn [g/mol] | 998 | 998 | 2010 | 2010 | Not used |
| [g] | 39.92 | 59.88 | 80.04 | 120.60 | |
| [mol] | 0.04 | 0.06 | 0.04 | 0.06 | |
| $K_2CO_3$ | | | | | |
| [g] | 304.052 | 304.052 | 304.052 | 304.052 | 269.51 |
| [mol] | 2.20 | 2.20 | 2.20 | 2.20 | 1.95 |
| NMP | | | | | |
| [ml] | 1050 | 1050 | 1050 | 1050 | 790 |
| Reaction time [h] | 9 | 9 | 9 | 9 | 14 |
| Properties | | | | | |
| V.N. [ml/g] | 35.2 | 37.2 | 36.6 | 38.1 | 33.6 |
| Theoretical Isosorbid cont. [wt. %] | 38.1 | 36.5 | 35.8 | 33.8 | 40.2 |
| Amount ISOSO[a] [wt %] | 36.9 | 35.8 | 35.3 | 33.3 | 37.4 |
| Rate of incorporation of ISOSO | 96.9 | 98.1 | 98.7 | 98.4 | 93.0 |
| Amount PEO[a] [wt %] | 5.0 | 7.4 | 9.8 | 13.9 | — |
| Tg [° C.] | 235 | 226 | 221 | 217 | 243 |
| CA [°] | 69 | 65 | 61 | 57 | 76 |

[a] as found in the polyarylene ether copolymer

The ISOSO comprising polyarylene copolymers according to this disclosure had higher viscosity numbers and the contact angle was lower than the ISOSO comprising polyarylene ether C1 prepared under comparative conditions. The reaction proceeded faster for the ISOSO comprising polyarylene copolymers according to this disclosure. In addition, the rate of incorporation of the ISOSO was higher.

Examples Preparation of Membranes

Preparation of the Casting Solution as Well as the Membrane:

Into a vessel equipped with a stirrer, nitrogen-inlet and thermometer 390 ml of NMP, 25 g of PVP (Luvitec® K40) and 50 g of PESU 1 as well as 35 g of the respective polyarylene ether copolymer according to the invention 1 to 4 or the polymer C1.

The mixture was heated under gentle stirring at 60° C. until a homogeneous clear viscous solution was obtained. The time to achieve the clear solution was monitored (see Table 3).

The solution was then degassed overnight at room temperature. After that the membrane solution was reheated at 60° C. for 2 hours and casted onto a glass plate with a casting knife (300 microns) at 60° C. using an Erichsen Coating machine operating at a speed of 5 mm/min. The membrane film was allowed to rest for 30 seconds before immersion in a water bath at 25° C. for 10 minutes.

After the membrane had detached from the glass plate, the membrane was carefully transferred into a water bath for 12 h. Afterwards the membrane was transferred into a bath containing 2500 ppm NaOCl at 50° C. for 4.5 h to remove PVP. After that process the membrane was washed with water at 60° C. and the one time with a 0.5 wt.-% solution of sodium bisulfite to remove active chlorine. After several washing steps with water the membrane was stored wet until characterization started.

In most cases a flat sheet continuous film with micro structural characteristics of UF membranes having dimension of at least 10×15 cm size is obtained. The membrane presents a top thin skin layer (1-3 microns) and a porous layer underneath (thickness: 100-150 microns).

Membrane Characterization

Using a pressure cell with a diameter of 60 mm, the PWP of the membranes was tested using ultrapure water (salt-free water, filtered by a Millipore UF-system). In a subsequent test, a solution of different PEG-Standards covering the molecular weight (Mw) range from 1000 to 1.000.000 g/mol, concentration of PEG/PEO 0.1 wt. % in water, was filtered at a pressure of 0.15 bar. By GPC-measurement of the feed and the permeate, the molecular weight cut-off was determined. For the GPC-measurements the solutions were used as obtained/prepared. The GPC-measurements were run at 35° C. using two columns with hydroxylated PMMA as stationary phase and a RI-detection system at a flow rate of 0.8 ml/min.

The composition of the solution and the results are given in Table 3.

TABLE 3

| Amount in [wt %] | MC1* | M1** | M2** | M3** | M4** | MC2* |
|---|---|---|---|---|---|---|
| PESU 1 | 10 | 10 | 10 | 10 | 10 | 17 |
| Copolymer 1 | | 7 | | | | |
| Copolymer 2 | | | 7 | | | |
| Copolymer 3 | | | | 7 | | |
| Copolymer 4 | | | | | 7 | |
| Polymer C1 | 7 | | | | | — |
| PVP | 5 | 5 | 5 | 5 | 5 | 5 |
| NMP | 78 | 78 | 78 | 78 | 78 | 78 |
| Time to dissolve [h] | 3.95 | 3.2 | 3.0 | 2.86 | 2.75 | 4.25 |
| PWP [l/m2 * h * bar] | 530 | 680 | 720 | 780 | 880 | 510 |
| MWCO [kD] | 57 | 56 | 53 | 56 | 59 | 59 |

*Comparative Membranes
**Membranes according to this disclosure

Membranes prepared from the polyarylene ether copolymers comprising ISOSO showed a higher permeability than those of the polyarylene ether C1 at comparative separation properties. The dope-solutions comprising the polyarylene ether copolymers according to this disclosure could be prepared in shorter time.

The invention claimed is:

1. A polyarylene ether copolymer comprising
   i) at least one block comprising in polymerized form
      A) isosorbide, isomannide, isoidide or a mixture thereof and
      B) at least one unit comprising at least one difunctional compound comprising at least one dichlorodiaryl sulfone, a dichlorodiaryl ketone or a mixture thereof and
   ii) at least one block comprising in polymerized form
      C) at least one polyalkylene oxide.

2. The polyarylene ether copolymer according to claim 1, comprising A) isosorbide.

3. The polyarylene ether copolymer according to claim 1, comprising
   C) at least one polyethylene oxide.

4. The polyarylene ether copolymer according to claim 1, wherein the polyalkylene oxide has a number average weight of from 200 to 20 000 g/mol, determined by potentiometric titration using potassium hydroxide solution.

5. The polyarylene ether copolymer according to claim 1, comprising in polymerized form
   E) at least one tri- or higher functional monomer.

6. The polyarylene ether copolymer according to claim 5, comprising
   E) 1,1,1-trishydroxyphenyl ethane.

7. The polyarylene ether copolymer according to claim 1, comprising
   i) at least one block comprising in polymerized form at least one unit of the general formula I

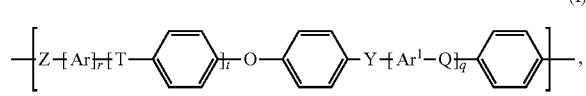

where the definitions of the symbols Z, r, t, q, Q, T, Y, Ar and Ar1 are as follows:

r: 0, or 1 t, q: independently of one another 0, or 1, or 2, or 3,

Q, T, Y: independently of one another in each case a chemical bond or group selected from —O—, —S—, —SO2-, S—O, C—O, —N=N—, and —CRaRb—, where Ra and Rb independently of one another are in each case a hydrogen atom or a C1 to C12-alkyl, C1 to C12-alkoxy, C3 to C12-cycloalkyl, or C6 to C18-aryl group, and where at least one of Q, T, and Y is —SO2- or —CO—, Z: a group derived from isosorbide, isomannide, or isoidide Ar and Ar¹: independently of one another an arylene group having from 6 to 18 carbon atoms.

8. A process for the preparation of a polyarylene ether copolymer comprising reacting
   a) isosorbide, isomannide, isoidide or a mixture thereof and
   b) at least one difunctional compound comprising a dichlorodiaryl sulfone, a dichloodiaryl ketone or a mixture thereof with
   c) at least one polyalkylene oxide.

9. The process according to claim 8 comprising reacting components a), b), and c) in the presence of at least one polar aprotic solvent in the absence of an azeotrope forming compound.

10. A method for preparation of coatings, films, fibers, foams, membranes or molded articles comprising utilizing a polyarylene ether copolymer according to claim 1.

11. The method according to claim 10, wherein the method is for the preparation of membranes.

12. A dope solution for the manufacture of membranes comprising at least one polyarylene ether copolymer according to claim 1.

13. A fiber comprising at least one polyarylene ether copolymer according to claim 1.

14. A membrane comprising at least one polyarylene ether copolymer according to claim 1.

15. An article comprising at least one membrane according to claim 14.

16. A method for contacting water, a body fluid, or a liquid in food production comprising utilizing the membrane according to claim 14.

17. A method for separating gases comprising utilizing the membrane according to claim 14.

* * * * *